(12) United States Patent
Singh et al.

(10) Patent No.: US 6,469,087 B1
(45) Date of Patent: Oct. 22, 2002

(54) STABILIZATION OF POLYMER BLENDS

(76) Inventors: Navjot Singh, 11 Montgomery Way, Clifton Park, NY (US) 12065; Farid Fouad Khouri, 6 Tamarack La., Clifton Park, NY (US) 12065

( * ) Notice: Subject to any disclaimer, the term of this patent is extended or adjusted under 35 U.S.C. 154(b) by 0 days.

(21) Appl. No.: 09/455,432

(22) Filed: Dec. 6, 1999

(51) Int. Cl.⁷ .................................................. C08K 3/26

(52) U.S. Cl. ........................ 524/425; 524/430; 524/448; 524/495

(58) Field of Search ................................ 524/492, 493, 524/425, 430, 448, 495, 496

(56) References Cited

U.S. PATENT DOCUMENTS

| | | | |
|---|---|---|---|
| 5,102,941 A | 4/1992 | Yamamoto et al. | |
| 5,391,594 A | 2/1995 | Romenesko et al. | |
| 5,665,803 A | 9/1997 | Nohr et al. | |
| 5,844,031 A | 12/1998 | Chen et al. | |

FOREIGN PATENT DOCUMENTS

| | | |
|---|---|---|
| EP | 424170 A2 | 4/1991 |
| EP | 543597 A2 | 5/1993 |
| EP | 752448 A2 | 1/1997 |

OTHER PUBLICATIONS

S. Endo, K. Min., J.L. White and T. Kyu, "Polyethylene–Polycarbonate Blends: Interface Modification, Phase Morphology and Measurement of Orientation Development During Cast Film and Tubular Extrusion by Infrared Dichroism", Polym. Eng. Sci., 26, 45 (1986) pp. 45–53.

"Molecular Design of Multicomponent Polymer Sysstems, Control of the Morphology of Polyethylene/polystyrene Blends by Block Copolymers", Makromol. Chem., 187, 837 (1986), pp. 837–852.

B.D. Favis and J.P. Chalifoux, "Influence of Composition on the Morphology of Polypropylene/Polycarbonate Blends", Polymer, 29, 1761 (1988) pp. 1761–1767.

A. Nakayama, P. Guegan, A. Hirao, T. Inoue and C.W. Macosko, "Compatibilizers for Melt Blending: Premade vs. Reactively Formed Block Copolymers", ACS Polymer Preprints, 34(2), 840 (Aug. 1993) pp. 840–841.

Rodrigues and Ishida, "Effect of Surface Treated Fillers on the Flow Behavior and Morphology of an Immiscible Blend. System: Polycarbonate/Polypropylene", Macromol. Symp., 104, 89–1111 (1996) pp. 89–111.

G.I. Taylor, "The Viscosity of a Fluid Containing Small Drops of Another Fluid", pp. 41–48Proc. Roy. Soc., A138, 41 (1932).

G.I. Taylor, "The Formation of Emulsions in Definable Fields of Flow", Proc. Roy. Soc., A147, 501 (1934) pp. 501–523.

S. Wu, "Formation of Dispeersed Phase in Incompatible Polymer Blends: Inteerfacial and Rehological Effects", Polym. Eng. Sci., 27, 335 (1987) pp. 335–343.

*Primary Examiner*—Edward J. Cain
(74) *Attorney, Agent, or Firm*—Bernadette M. Bennett; Noreen C. Johnson (57) ABSTRACT

Disclosed are stabilized polymeric blends wherein two components having different viscosities are stabilized by the use of a filler material. Also disclosed are methods for the formation of such stabilized blends.

40 Claims, 9 Drawing Sheets

Example 11  Example 12

STABILIZATION OF POLYMER BLENDS

BACKGROUND OF THE INVENTION

The present invention pertains to the field of polymer blend morphology stabilization. Specifically, the invention uses a filler material to modify the viscosity of a lower viscosity dispersed phase in a matrix of an immiscible higher viscosity polymer, resulting in a stable morphology of the blend.

It is well known in the art of polymer blend development that the equilibrium morphology in a blend system is a balance between drop breakup and coalescence of the dispersed phase. The tendency for drops of the minor phase to break up depends on the ratio of the maximum shear stress that deforms the drop to the interfacial stress that resists the breakup. It is affected by the interfacial tension between the components of the blend, differences in the viscosity of the dispersed phase and the matrix phase, and the shear forces to which the blend is exposed during processing.

Most coalescence studies in polymer blends have not used mechanical mixing. Rather, researchers have studied coalescence in solvent cast blends or melt blends prepared under quiescent conditions. Coalescence in molten blends without the influence of mechanical stress has been modeled by Fortelny and Kovar (I. Fortenly and J. Kovar, *J. Polym. Comp.*, 9, 119 (1988)). They found that the amount of coalescence in blends decreases significantly if the matrix phase viscosity is above a critical value. Other researchers have shown that the coalescence depends on the probability of collisions and that the probability increases with increasing volume concentration of the dispersed phase. It has also been proposed that interfacial compatibilization reduces the interfacial mobility, hence reducing the probability for coalescence (S. Endo, K. Min, J. L. White and T. Kyu, *Polym. Eng. Sci.*, 26, 45 (1986); R. Fayt, R. Jerome and P. Tessie, *Makromol. Chem.*, 187, 837 (1986); B. D. Favis and J. P. Chalifoux, *Polymer*, 29, 1761 (1988); A. Nakayama, P. Guegan, A. Hirao, T. Inoue and C. W. Macosko, *ACS Polymer Preprints*, 34 (2), 840 (August 1993)).

Coalescence is a function of the volume fraction of the dispersed phase, drop size, the mobility of the interface, and the mixing conditions. For Newtonian fluids, coalescence of a dispersed phase has been explained by models which account for the probability of particle collisions and the efficiency of such collisions. For non-Newtonian fluids, the probability of diffusion related collisions is overcome by the much greater probability of collisions due to shear forces, particularly under molding conditions, and most especially under abusive injection molding conditions where shear forces are high. Coalescence of the particles of the dispersed phase results in their uneven distribution. Therefore, as a result of the high shear forces experienced during injection molding operations, the minor phase often coalesces. When molded parts are made from blends where coalescence of the minor phase is a problem, the molded parts suffer from severe delamination and have a poor surface appearance as well as reduced ductility.

In the past, stabilization and prevention of coalescence have often been achieved by the addition or the formation of block or graft copolymers at the interface between the phases. These copolymers join at least a fraction of the two phases by covalent bonds, lowering interfacial tension and retarding coalescence. Retardation of coalescence in the blend improves the stability of the blend morphology and thereby reduces the deleterious effects that processing history can have on the performance of the blend, such as delamination. The failure properties of the blend also are improved when the desired morphology is stabilized by the proper degree of interfacial adhesion.

Addition of block copolymers or the use of functionalized homopolymers which can react to form copolymers in situ ("reactive compatibilization") is an effective method for compatibilization of two immiscible phases in a polymer blend and prevention of coalescence. However, the block copolymers (or other copolymer-like core shell polymers) and functionalized homopolymers are expensive to produce. Moreover, in situ functionalization of homopolymers by adding functionalizing agents during the process of extrusion can result in some instances in the formation of undesirable side products or in a reduction in the polymer molecular weight. These side reactions can detrimentally affect other blend properties.

U.S. patent application Ser. No. 09/293,915, filed Apr. 19, 1999 is concerned with a method for improving the physical properties of thermoplastic molding compositions. A polyester or polyamide is blended with an impact modifier and an epoxy- or orthoester-functionalized compound. The epoxy- or orthoester-functionalized compound is the compatibilizing agent for the polyester or polyamide blend and an impact modifier. The impact modifier consists of several silicone components such as a polysiloxane compound, an inorganic filler, and optionally, a silicone additive. The silicone powder or silicone rubber combined with the compatibilizer yields a blend product with high impact strength. One objective of this invention is to improve the physical properties of polyester- or polyamide-based blends through the combination of fillers in the dispersed phase and the compatibilization through an epoxy functionalized fluid.

U.S. Pat. No. 5,102,941 is directed to a thermoplastic polyester composition composed of a polyester, a crosslinked polyorganosiloxane latex rubber, a functionalized silane containing at least one alkoxy or chloride radical, and optionally, a filler. The polyorganosiloxane rubber is a crosslinked latex with an average particle diameter of 0.1 to 0.5 $\mu$m and a swelling degree of 3 to 50. The functional groups on the silane may be epoxy, including for example glycidoxyalkyl or $\beta$-(3,4-epoxycyclohexyl)ethyl, isocyanate, or amino groups. Reinforcing fillers which optionally may be added to the blend are glass fibers, carbon fibers, aramid fibers, metal fibers, asbestos fibers, whiskers, glass beads, glass flakes, calcium carbonate, talc, mica, aluminum oxide, magnesium hydroxide, boron nitride, beryllium oxide, calcium silicate, clay, and metal powders. The addition of silica fillers is not suggested. In addition, the dispersed rubbery phase is crosslinked.

The use of fillers to compatabilize polymer blends has been shown by Rodrigues and Ishida (*Macromol. Symp.* 104, 89–111 (1996)), where specific chemical treatments on the surface of the filler have been used to compatabilize two imiscible blends. The method described by Rodrigues and Ishida involves melt blending a surface treated glass bead filler with a polycarbonate/polypropylene system to form thermoplastic pellets. The method is hereinafter known as "Process B". It has been observed that in the case with the right chemical treatment, the filler is located at the interface between the two polymers and compatabilizes the blends.

U.S. Pat. No. 5,391,594 is directed to a method for imparting fire retardancy to organic resins through the addition of a silicone polymer powder. The method involves mixing a silica filler with a polydiorganosiloxane polymer to form a powder. The silica filler used has an average particle size of 1 to 1000 microns. The resulting powder is then melt blended with a thermoplastic resin to form thermoplastic pellets. The method described in this patent is hereinafter known as "Process A".

The importance of viscosity of the dispersed phase as compared to the matrix phase was applied in U.S. Pat. No. 5,844,031 which teaches the importance of mixing at a temperature which is within 30° C. of a temperature where the difference between the dispersed phase viscosity and the matrix viscosity is the lowest at a predetermined shear rate. That patent, however, does not teach confining fillers to one of the phases to modify its viscosity and processing the compositions at temperatures and shear rates such that the viscosity ratio between the dispersed and the matrix phase is optimized. The patent also does not recognize that this phenomenon can be extended to other dispersed systems wherein the viscosity of a dispersed phase of non-silicone elastomers can also be controlled by adding a controlled amount of the filler.

Drop break-up in the dispersion of polymer blends was first studied by Taylor (G. I. Taylor, *Proc. Roy. Soc.*, A138, 41 (1932); G. I. Taylor, *Proc. Roy. Soc.*, A146, 501 (1934)). Taylor modeled the drop size using the viscosity ratio and the capillary number. For simple shear forces, Taylor balanced the interfacial forces and shear forces to obtain a relationship for the maximum drop size that will be stable. Several researchers have studied the drop break-up phenomenon under various complex conditions highlighting the importance of viscosity ratio in controlling the break-up of the dispersed phase in immiscible polymer blends. A correlation relating capillary number to viscosity ratio in twin screw extruded polymer blends has been given by Wu (S. Wu, *Polym. Eng. Sci.*, 27, 335 (1987)):

$$D = \frac{4\Gamma \eta_r^{\pm 0.84}}{\dot{\gamma}\eta_m}$$

where the plus sign in the exponent applies for $\eta_r > 1$ and the minus sign in the exponent applies for $\eta_r < 1$. $\Gamma$ is the interfacial tension, $\dot{\gamma}$ is the shear rate, D is the diameter of the drop, where $\eta_r = \eta_d/\eta_m$ where $\eta_d$ is the viscosity of the dispersed phase and $\eta_m$ is the viscosity of the matrix phase. This relationship highlights the importance of interfacial tension, viscosity ratio and the matrix phase viscosity in controlling the maximum droplet size of the dispersed phase.

Among the several methods described above to produce stable polymer blends, an efficient method has yet to be developed which does not used compatibilizing techniques, grafting techniques, or block copolymer additives. The importance of the confinement of the filler in the dispersed phase and the importance of viscosity modification with respect to the dispersed phase has yet to be addressed. In addition, delamination continues to be a problem. Therefore, there remains a need for efficient alternative strategies for stabilizing the dispersed phase morphology of immiscible polymer blends in order to prevent delamination and to optimize other blend properties.

SUMMARY OF THE INVENTION

In one aspect, the present invention provides a polymer blend which comprises:
 a) a matrix phase polymer;
 b) a dispersed phase polymer being contained within the matrix phase polymer and initially having a lower viscosity than the matrix phase polymer; and
 c) a filler material contained within the dispersed phase polymer to form a modified dispersed phase polymer wherein the filler is substantially contained within the phase boundary of the modified dispersed phase polymer;

wherein the viscosity of the modified dispersed phase polymer is increased by the filler, thereby improving the stability of the dispersion of the modified dispersed phase polymer in the matrix phase polymer.

In another embodiment, the present invention provides a method for the formation of a blend of a matrix phase polymer and a dispersed phase polymer initially having a lower viscosity than the matrix phase polymer, said method comprising:
 a) dispersing a filler material within the dispersed phase polymer to form a modified dispersed phase polymer having an increased viscosity wherein the filler is substantially contained within the phase boundary of the dispersed phase polymer; and
 b) dispersing the modified dispersed phase polymer within the matrix phase polymer.

In a further embodiment, the present invention provides a method for the formation of a blend of a matrix phase polymer and a dispersed phase polymer which comprises at least one of the following steps:
 (I) pre-dispersing a dispersed phase polymer with a filler to form a modified dispersed phase polymer;
 (II) mixing in a reactor the modified dispersed phase polymer with a matrix phase polymer to form a powder wherein the temperature in the reactor is less than the melting point of the matrix phase polymer; and
 (III) intimately mixing the powder wherein the temperature is greater than the melting point of the matrix phase polymer.

DETAILED DESCRIPTION OF THE INVENTION

The present invention provides a method of stabilizing the blend morphology of immiscible polymer blends. It allows the development of new blend types and a simple, efficient method of stabilizing immiscible polymer blends without resorting to the use of expensive graft or block copolymer additives, or reactive compatibilization techniques. In particular, the present invention is not concerned with chemical compatabilization of two immiscible blends. Instead, the present invention is focused on a reduction in dispersed phase coalescence efficiency and the ability to shear the dispersed phase by modifying the modulus and viscosity of the dispersed phase through fillers that stay confined in the dispersed phase.

It has surprisingly been found that filler materials modify the melt elasticity and viscosity of a dispersed phase of a lower viscosity material sufficiently to result in a reduction of the efficiency of dispersed phase particle collisions in a higher viscosity matrix. Since the efficiency of such collisions is inversely related to the modulus of the dispersed phase (for instance, more elastic, higher modulus dispersed phase particles have a lower probability of coalescing upon collision), this reduces the coalescence of the dispersed phase under conditions of high shear experienced, for example, during injection molding. Selective precompounding or extrusion of polymer components with fillers can change the viscosity and/or elasticity of the dispersed phase polymer prior to forming the blend, so that a customized viscosity/elasticity ratio of the blend components may be achieved, obviating the need for added compatibilizers. "Melt elasticity" as used herein refers to the ability of a melt to retain its original configuration after dispersive forces have been applied to the melt. "Viscosity" as used herein refers to the ability of a melt to flow.

The present invention offers the opportunity for developing new blend systems or improving current blends by adjusting the melt elasticity/viscosity ratio of a dispersed phase and a matrix phase. The use of conventional compatibilization strategies in combination with the addition of inorganic fillers can provide further improvements to the properties of these blends. "Dispersed phase" as used herein refers to material which is distributed through a matrix phase. "Matrix phase" as used herein refers to material which provides the continuous framework for a polymer blend.

There is a wide range of suitable materials that may be used as the matrix phase in the present invention. Matrix phase polymers are crystalline or amorphous. Examples of matrix phase polymers include polyesters, polycarbonates, polystyrenes, polymethylmethacrylates, polyketones, polyamides, aromatic polyethers such as polyether sulfones and polyether imides, polyether ketones, polyetherether ketones, polyphenylene ethers, polyphenylene sulfides, and combinations thereof. The volume of the matrix phase polymer is in a range between about 65% by volume and about 99% by volume of total polymer. "Total polymer" as used herein refers to both resin and filler with any additives.

There is likewise a wide range of suitable materials that may be used as the lower viscosity dispersed phase in the present invention. Such include rubbery polymers, for example natural rubber, silicone rubber, ethylene-propylene rubber, ethylene/(alpha)olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

There is a wide range of suitable materials that may be used as the filler material in the present invention. Preferred fillers include inorganic materials, such as carbon black, hydrated amorphous silica, fumed silica, fumed titanium dioxide, fumed aluminum oxide, diatomaceous earth, talc, calcium carbonate, and combinations thereof. The ratio of the filler to the dispersed phase depends among other factors on the viscosity modification capability of the filler.

Additives may also be incorporated into the polymeric blend as, for example, pigments, dyes, impact modifiers, UV screeners, flame retardants, other reinforcing and/or extending fillers, epoxy-containing additives, silica fume, stabilizers, flow aids, ester interchange inhibitors, mold release agents, and other appropriate additives typical of polymer blend compositions.

In general, the blends of the present invention may be formed by dispersing the filler material within the dispersed phase polymer to form a modified dispersed phase polymer, then dispersing the modified material within the matrix phase polymer. "Modified dispersed phase polymer" as used herein refers to the dispersed phase polymer which is modified with filler. Typically, the ratio of the filler to the dispersed phase polymer is in a range between about 3% by weight and about 90% by weight of the dispersed phase polymer. The filler is substantially contained within the phase boundary of the dispersed phase polymer. "Substantially contained" as used herein refers to a filler which is at least 90% by volume within the phase boundary of the dispersed phase and preferably, at least 95% by volume within the phase boundary. "Phase boundary" as used herein refers to the interface of the dispersed phase polymer and the matrix phase polymer.

Figure 9:
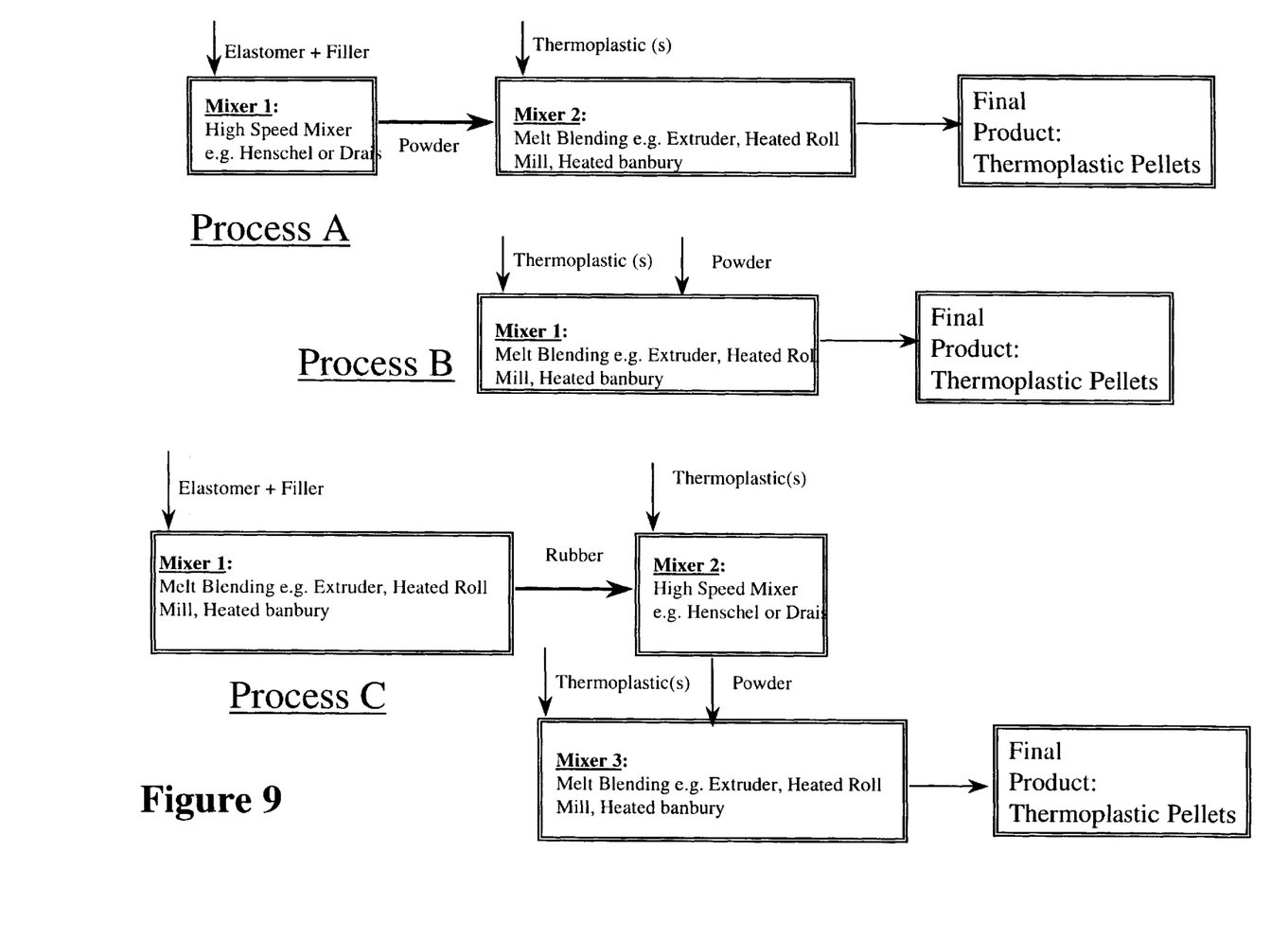
FIG. 9 is an illustration of differences in Processes A and B as compared with Process C as described in the present invention.

The preferred process for obtaining the dispersion is illustrated in FIG. 9 as Process C. The first step involves a mixing step where the filler is melt blended with the dispersed phase polymer in a Banbury mixer, a Dough mixer, a roll mill, or extruded on conventional extrusion equipment. The goal of the first step is to ensure that the filler is completely wetted by the polymer, and to take advantage of the strong interaction of the dispersed phase polymer and the filler surface. If the interactions are not favorable enough naturally, it may be desirable to pretreat the filler to ensure strong interactions between the filler and the dispersed phase so that the filler stays confined in the dispersed phase as defined hereinabove.

The modified dispersed phase polymer is then mixed with the matrix phase polymer. In the case where the high viscosity of uncured blends restricts the convenient feeding of these materials to conventional melt processing equipment, solid state dispersion techniques, as described in U.S. patent application Ser. No. 08/742,536, filed Nov. 1, 1996, can be used to first pre-disperse elastomers in thermoplastics to create free flowing powders which can then be directly fed into the extruder. Typically, this mixing occurs in a Henschel mixer at a temperature which is less than the melting point of the matrix phase polymeric component. This step is illustrated in Process C in FIG. 9 as the second mixing step. During the step of forming a powder, the modified dispersed phase polymer successfully adheres to the matrix phase polymer blend.

In the subsequent mixing step of Mixer 3 in Process C of FIG. 9, the components are well mixed in a melt mixing process. However, due to the strong interaction between the filler and the dispersed phase polymer, the filler stays substantially confined in the dispersed phase. The method of process C successfully pre-compounds the filler in the dispersed phase.

Before the addition of filler to the dispersed phase polymer, the viscosity of the dispersed phase polymer is less than the viscosity of the matrix phase polymer. Typically, filler is added to the dispersed phase polymer such that the viscosity of the modified dispersed phase polymer is increased up to the viscosity of the matrix phase polymeric component. Preferably, the nature and amounts of the blend components are chosen such that the viscosity ratio of the matrix phase polymer to that of the modified dispersed phase polymer is in a range between about 1 and about 12, measured at a shear rate of about 400 $s^{-1}$ at a temperature the blend is conventionally processed. Most preferably the ratio is in a range between about 1 and about 1.5, measured at a shear rate of about 400 $s^{-1}$ at a temperature the resin is conventionally processed.

Changing the viscosity ratio with the addition of a filler effectively solves the problem of delamination on the surface of a part molded from a polymeric blend. "Delamination" as used herein refers to the macroscopic separation of constituent components of a polymer blend resulting in a layered structure on the surface of a molded part. When there is no delamination on the surface of the molded part, the molded part appears to be smooth with a uniform composition. The increase in the viscosity through the addition of filler improves the stability of the dispersion of the modified dispersed phase polymer.

Molding conditions of the compounded blend are such that the injection speed of the blend is in a range between greater than 0 inches per second and about 6 inches per second and, more typically greater than 0 inches per second and about 4 inches per second.

In order that those skilled in the art will be better able to practice the invention, the following examples are given by way of illustration and not by way of limitation.

EXAMPLES 1–10

The polybutylene terephthalate used is Valox® 315 which is made by GE Plastics. "PBT+10 pph PDMS" refers to polybutylene terephthalate polymer filled with 10 parts PDMS per hundred parts PBT. "PBT+16.3 pph SE 6075" refers to polybutylene terephalate polymer filled with 16.4 parts per hundred SE 6075. SE 6075 refers to the silicone gum with the fumed silica. PDMS refers to the unmodified silicone gum. Silicone gum/fumed silica formulations were either obtained from GE Silicones or compounded in the laboratory. Compounding of the filler with silicone gum was performed on a batch Banbury mixer using sigma-style blades with a batch size in a range between about 2500 grams and about 3000 grams. The fumed silica was added in parts to ensure uniform dispersion. The material was roll-milled after dispersion to further homogenize the mixture.

The mixing was carried out as described in Process C. In the case where the silicone gum was directly mixed with PBT, the first mixing step was skipped and the dispersion was carried out using the solid state dispersion techniques, as described in U.S. patent application Ser. No. 08/742,536, filed Nov. 1, 1996. The blends were mixed for up to 5 minutes in a high speed Henschel mixer. The resulting dry blends were melt blended by extrusion on a 20 mm twin screw extruder with six zone temperatures of 200° F., 400° F., 480° F., 480° F., 480° F., 480° F. and a die temperature of 480° F. The extruder was operated at speeds of 300–400 rpm and the feed rate was such that the amperage drawn was approximately 5 amps. The resulting pellets were dried in a circulating air oven at 110° C. for 4 hours and then molded into tensile and Izod test bars on a 28 ton molding machine with barrel temperatures of 480° F. and a mold temperature in the range between about 135° F. and about 145° F.

Figure 1:
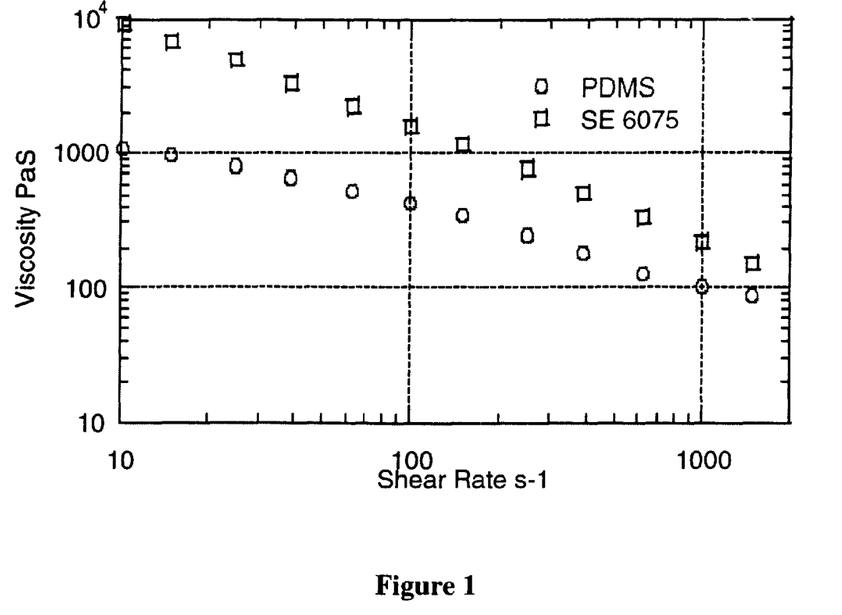
FIG. 1 is a graphical representation of viscosity as measured by capillary rheometry of unmodified silicone gum and silicone gum with additional fumed silica.

The addition of fumed silica to the silicone gum resulted in modification of the viscosity of the silicone gum as shown in FIG. 1. FIG. 1 is a comparison of viscosity as measured by capillary rheometry using a length to diameter ratio of 30 and a 1 millimeter die at a temperature of 250° C.

The parts were examined for tendency to delaminate as measured by the narrowness of the processing window and the visual surface finish. In order to be consistent, all the samples reported in examples 1–10 were compared at an injection speed of 2 inches per second. A careful evaluation of the impact of injection speed on the tendency to delaminate revealed that the delamination increased with increasing injection speed. The delamination was also observed to be the most severe around the gate region and was highly dependent on the geometry of the gate. The gate is the region from which the melted polymer flows into a mold.

Figure 2:
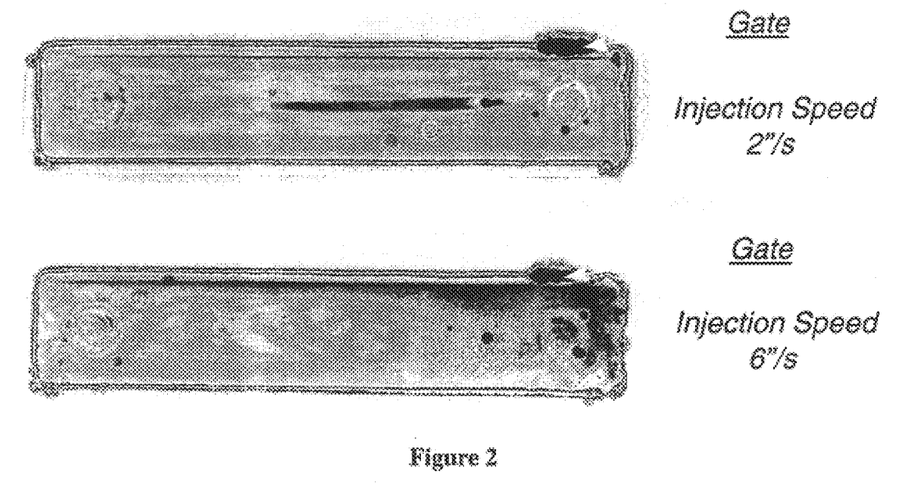
FIG. 2 is a picture obtained by acoustic microscopy of Example 3 molded at injection speeds of 2 inches per second and 6 inches per second.
Figure 3:
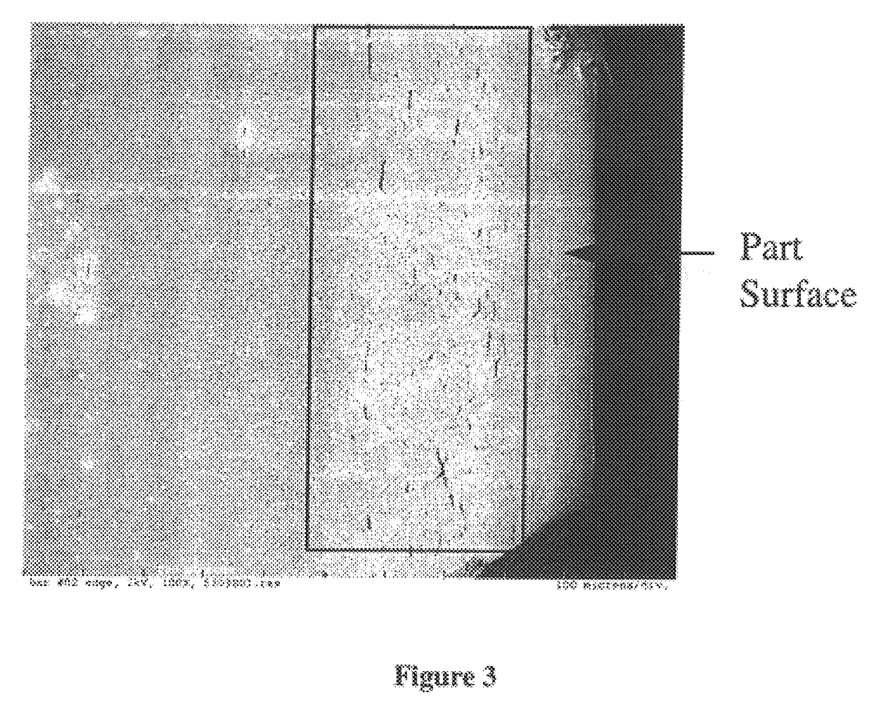
FIG. 3 is a picture obtained from scanning electron microscopy of Example 4 showing coalescence and delamination near the surface.
Figure 4:
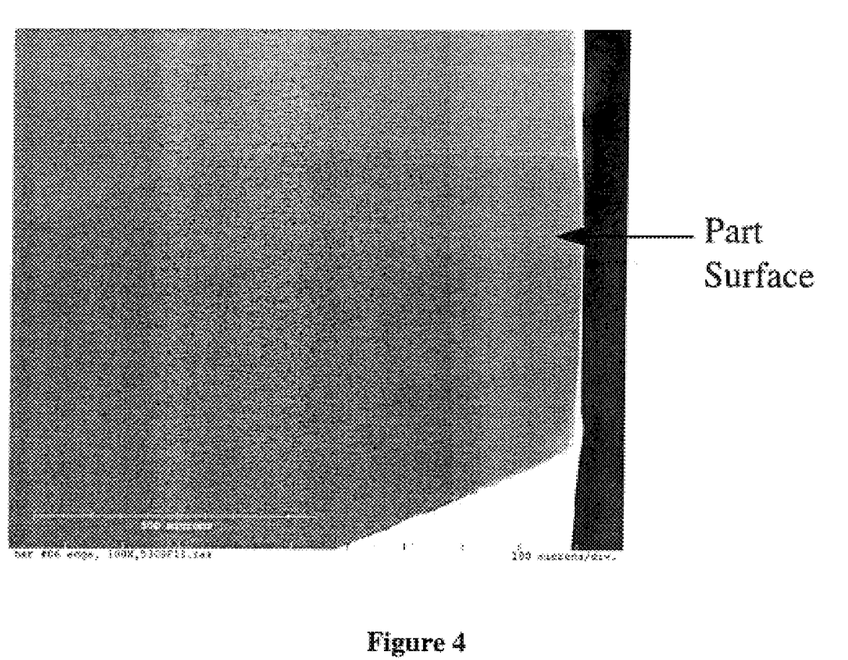
FIG. 4 is a picture obtained from scanning electron microscopy of Example 3 showing the lack of coalescence and delamination near the surface.

Delamination was also evaluated using alternate methods on select samples. As an example, Izod bars of material from Example 3 were injection molded at two different speeds, i.e. 2 inches per second and 6 inches per second. The materials were then evaluated by acoustic microscopy. It can be clearly seen through the use of acoustic microscopy, that extensive density variations can be observed in the gate region and the surface of the samples as shown in FIG. 2. Scanning electron microscopy (SEM) evaluations of the materials molded from Examples 3 and 4 at 2 inches per second are shown, respectively, in FIG. 4 and FIG. 3. Clearly the use of a lower loading of fumed silica results in less coalescence of the dispersed phase near the surface.

Figure 5:
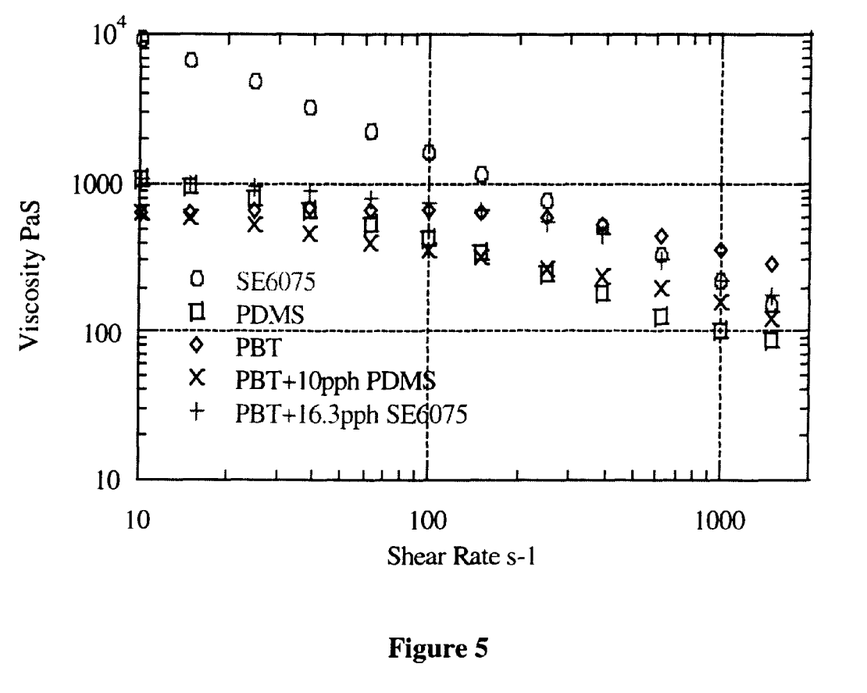
FIG. 5 is a graphical representation of viscosity as measured by capillary rheometry of polybutylene terephthalate with unmodified silicone gum, and with silicone gum modified with fumed silica.

A superposition of the viscosity profile of polybutylene terephthalate with the silicone gum, silicone rubber and some of the examples of Table 1 is shown in FIG. 5. FIG. 5 is a comparison of viscosity as measured by capillary rheometry using a capillary with length to diameter ratio of 30 and a 1 millimeter die at a temperature of 250° C. While the typical shear rates encountered in the process of extrusion are around 100 $s^{-1}$ shear rates in the range between about 100 $s^{-1}$ and about 1000 $s^{-1}$ are typically observed during the process of injection molding depending on the geometry of the part and the molding temperature. As a reference, the viscosity ratios between the dispersed phase and the matrix phase were measured at a shear rate of 400 $s^{-1}$ by capillary rheometry at a temperature the blend is conventionally processed. The use of fumed silica filled silicone gum of Example 3 increased the viscosity of the silicone rubber closer to that of polybutylene terephthalate (Example 1). As a consequence the viscosity ratio of the polybutylene terephthalate to that of the dispersed silicone phase decreased from 2.5 for the unfilled silicone gum to close to 1 for the filled silicone gum at a shear rate of 400 $s^{-1}$.

It is important that the fumed silica stay confined in the dispersed phase in order to produce a stable morphology of the blend. Microscopic evaluation of these blends revealed that due to the strong interaction between the silicone gum and fumed silica, the fumed silica remained confined in the silicone phase.

EXAMPLES 11–12

"PPO®+10 pph PDMS" refers to polyphenylene oxide polymer filled with 10 parts PDMS per hundred parts PPO. "PPO+16.3 pph SE 6075" refers to polyphenylene oxide polymer filled with 16.3 parts SE 6075 per hundred PPO. Silicone gum/fumed silica formulations were either obtained from GE Silicones or compounded in the laboratory. Compounding of the filler with silicone gum was performed on a batch Banbury mixer using sigma-style blades with a batch size in a range between about 2500 grams and about 3000 grams. The fumed silica was added in parts to ensure uniform dispersion. The material was roll-milled after dispersion to further homogenize the mixture.

The mixing was carried out as described in Process C. In the case where the PDMS was directly mixed with PPO, the first mixing step was skipped and the dispersion was carried out using the solid state dispersion techniques, as described in U.S. patent application Ser. No. 08/742,536, filed Nov. 1, 1996. One hundred parts by weight polyphenylene oxide resin were mixed with the amounts of filled/unfilled silicone gum/rubber as indicated in Table 1 for up to 5 minutes in a high speed Henschel mixer. The resulting dry blends were melt blended by extrusion on a 20 mm twin screw extruder with six zone temperatures of 200° F., 400° F., 575° F., 575° F., 575° F., 575° F. and a die temperature of 575° F. The extruder was operated at speeds of 300–400 rpm and the feed rate was such that the amperage drawn was approximately 5 amps. The resulting pellets were dried in a circulating air oven at 110° C. for 4 hours and then molded into tensile and Izod test bars on a 28 ton molding machine with barrel temperatures of 575° F. and a mold temperature in the range between about 200° F. and about 210° F.

The parts were examined for tendency to delaminate as measured by the narrowness of the processing window and the visual surface finish. In order to be consistent, all the samples reported in examples 11–12 were compared at an injection speed of 2 inches per second. A careful evaluation of the effect of injection speed on the tendency to delaminate revealed that the delamination increased with increasing injection speed. The delamination was also observed to be the most severe around the gate region and was highly dependent on the geometry of the gate.

Figure 6:
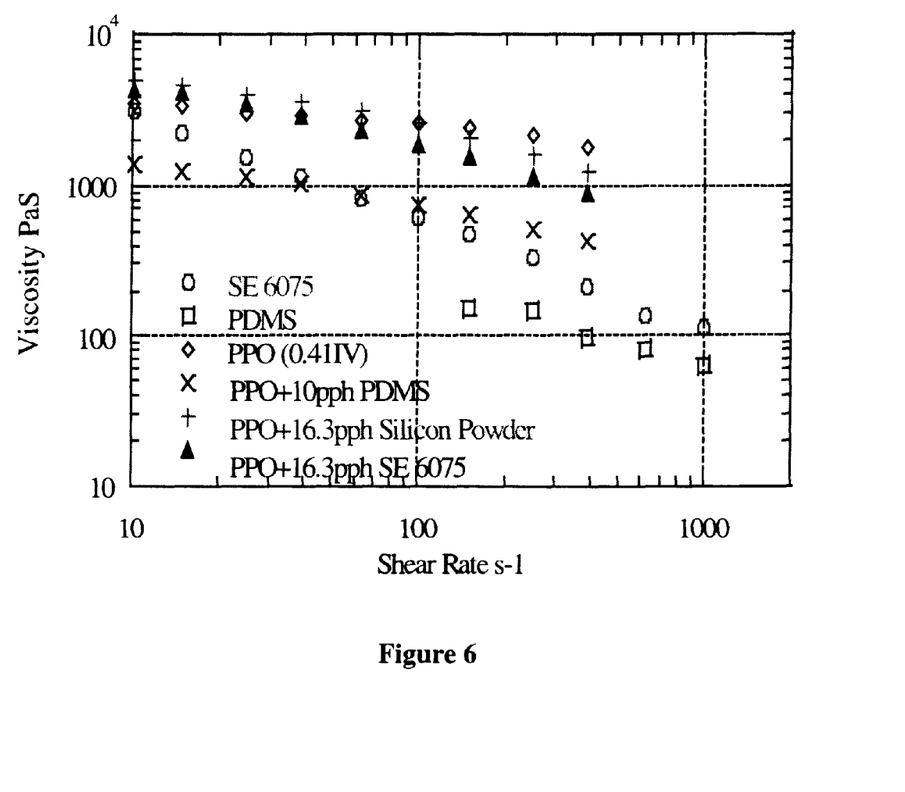
FIG. 6 is a graphical representation of viscosity as measured by capillary rheometry of polyphenylene oxide with unmodified silicone gum, and with silicone gum modified with fumed silica.

A superposition of the viscosity profile of polyphenylene ether with the silicone gum and silicone rubber is shown in FIG. 6. FIG. 6 is a comparison of viscosity as measured by capillary rheometry using a capillary with length to diameter ratio of 30 and a 1 millimeter die at a temperature of 315° C. While the typical shear rates encountered in the process of extrusion are around 100 $s^{-1}$, shear rates in the range between about 100 $s^{-1}$ and about 1000 $s^{-1}$ are typically observed during the process of injection molding depending on the geometry of the part and temperature of the molding. As a reference, the viscosity ratios between the dispersed phase and the matrix phase were measured at a shear rate of 400 $s^{-1}$ as measured by capillary rheometry at a temperature the blend is conventionally processed. The viscosity ratio of polyphenylene ether to that of the dispersed silicone phase decreased from 20 for the unfilled silicone gum to close to 10 for the filled silicone gum at a shear rate of 400 $s^{-1}$. It is interesting to note that since the viscosity ratio of polyphenylene ether to that of the silicone rubber is not as close as that of polybutylene terephthalate to that of silicone rubber (Example 3), the processing window for robust molding of the polyphenylene ethersiloxane rubber blends was much narrower as compared to that of polybutylene terephtalate-silicone rubber blends.

Figure 8:
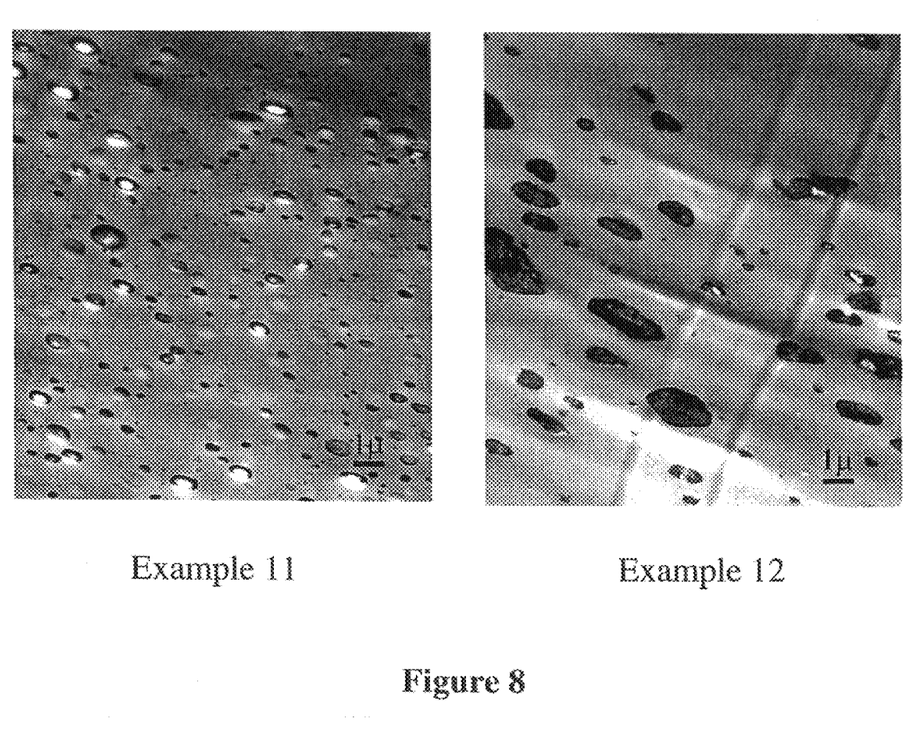
FIG. 8 is a picture obtained from scanning electron microscopy of Examples 11 and 12 showing silica filler confined in the silicone dispersed phase.

Microscopic evaluation of these blends revealed that due to the strong interaction between the silicone gum and fumed silica, the fumed silica remained confined in the silicone phase as shown in FIG. 8.

EXAMPLES 13–16

One hundred parts by weight high impact polystyrene (HIPS) resin were mixed with the amounts of silicone gum indicated in Table 1 for up to 10 minutes in a high speed Henschel mixer. The resulting dry blends were melt blended by extrusion on a 20 mm twin screw extruder with six zone temperatures of 200° F., 400° F., 480° F., 480° F., 480° F., 480° F. and a die temperature of 480° F. The extruder was operated at speeds of 300–400 rpm and the feed rate was such that the amperage drawn was approximately 5 amps. The resulting pellets were dried in a circulating air oven at 110° C. for 4 hours and then molded into tensile and Izod test bars on a 28 ton molding machine with barrel temperatures of 400° F. and a mold temperature in the range between about 125° F. and about 135° F.

Figure 7:
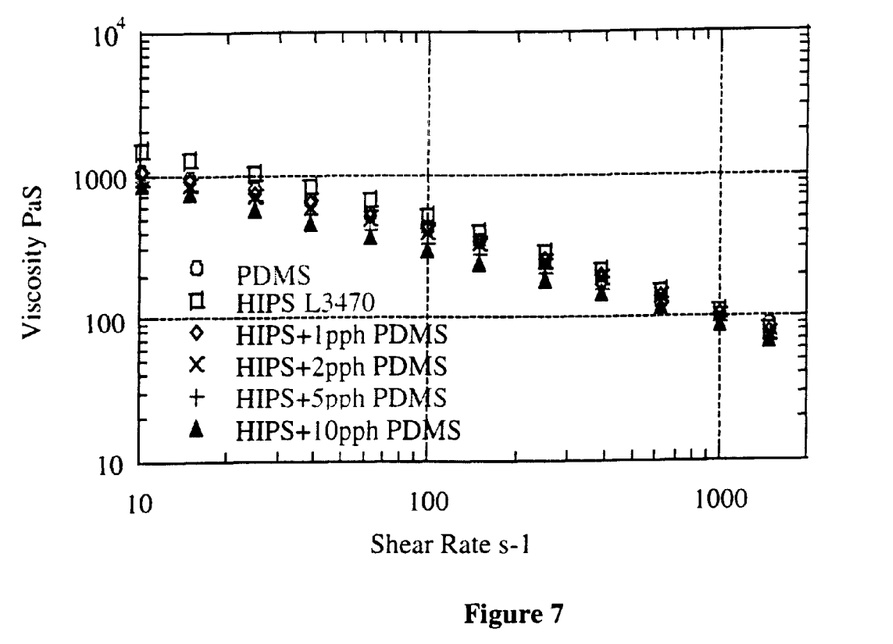
FIG. 7 is a graphical representation of viscosity as measured by capillary rheometry of high impact polystyrene with different levels of unmodified silicone gum.

A superposition of the viscosity profile of high impact polystyrene with the silicone gum and select examples from Table 1 is shown in FIG. 7. FIG. 7 is a comparison of viscosity as measured by capillary rheometry using a capillary with length to diameter ratio of 30 and a 1 millimeter die at a temperature of 250° C. The silicone gum added to the high impact polystyrene polymer is added by parts per hundred parts HIPS. While the typical shear rates encountered in the process of extrusion are around 100 $s^{-1}$, shear rates in the range between about 100 $s^{-1}$ and 1000 $s^{-1}$ are typically observed during the process of injection molding depending on the geometry of the part and temperature of the molding. As a reference, the viscosity ratios between the dispersed phase and the matrix phase were measured by capillary rheometry at a shear rate of 400 $s^{-1}$ at a temperature the blend is conventionally processed. The viscosity ratio of high impact polystyrene to that of the dispersed silicone phase in Examples 13–16 was around 1.5 at a shear rate of 400 $s^{-1}$. It is interesting to note that since the viscosity ratio of high impact polystyrene to that of the silicone gum itself is close to one, the blends with silicone gum with high impact polystyrene had a wider processing window as compared with blends of polybutylene terephthalate with silicone gum.

EXAMPLES 17–18

One hundred parts by weight polycarbonate (PC) resin was mixed with 10 parts silicone gum per hundred parts PC and 2.5 parts epoxy additive per hundred parts PC (Example 17). In Example 18, one hundred parts by weight polycarbonate (PC) resin was mixed with 10 parts silicone gum, 6.3 parts fumed silica and 2.5 parts epoxy additive as illustrated by the steps of Process C. Silicone gum/fumed silica formulations were either obtained from GE Silicones or compounded in the laboratory. Compounding was performed on a batch Banbury mixer using sigma-style blades with a batch size in a range between about 2500 grams and about 3000 grams. The fumed silica was added in parts to ensure uniform dispersion. The material was roll-milled after dispersion to further homogenize the filler and gum.

The silicone-filler mixture was then mixed with polycarbonate powder for up to 5 minutes in a high speed Henschel mixer. The resulting dry powder was then melt blended by extrusion on a 20 millimeter twin screw extruder with six zone temperatures of 200° F., 400° F., 550° F., 550° F., 550° F., 550° F. and a die temperature of 600° F. The extruder was operated at speeds of 400 rpm and the feed rate was such that the amperage drawn was approximately 5 amps. The resulting pellets were dried in a circulating air oven at 110° C. for 4 hours and then molded into tensile and Izod test bars on a 28 ton molding machine with barrel temperatures of 550° F. and a mold temperature in the range between about 145° F. and about 150° F.

The parts were examined for tendency to delaminate as measured by the narrowness of the processing window and the visual surface finish. In order to be consistent, all the samples reported in examples 17–18 were compared at an injection speed of 2 inches per second. A careful evaluation of the impact of injection speed on the tendency to delaminate revealed that the delamination increased with increasing injection speed. The delamination was also observed to be the most severe around the gate region and was highly dependent on the geometry of the gate. The gate is the region from which the melted polymer flows into a mold.

While typical embodiments have been set forth for the purpose of illustration, the foregoing descriptions should not be deemed to be a limitation on the scope of the invention. Accordingly, various modifications, adaptations and alternatives may occur to one skilled in the art without departing from the spirit and the scope of the present invention.

polycarbonates, polystyrenes, polymethylmethacrylates, polyketones, polyamides, aromatic polyethers, polyether sulfones, polyether imides, polyether ketones, polyetherether ketones, polyphenylene ethers, polyphenylene sulfides, and combinations thereof.

4. The composition of claim 1, wherein the dispersed phase polymer is a rubbery polymer.

5. The composition of claim 4, wherein the rubbery polymer is selected from the group consisting of natural rubber, silicone rubber, ethylenepropylene rubber, ethylene/(alpha)olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

6. The composition of claim 1, wherein the viscosity ratio of the matrix phase polymer to the modified dispersed phase

TABLE 1

Summary of examples prepared from different thermoplastics, levels of silicone gums and fillers.

| Example | PBT | PPO | HIPS | PC | Silicone Gum | Fumed Silica | Fumed Alumina | Fumed Titania | Celite 270 | Silica Fume | Epoxy Additive | Viscosity Ratio | Delamination Rating |
|---|---|---|---|---|---|---|---|---|---|---|---|---|---|
| 1 | 100 | — | — | — | 10 | — | — | — | — | — | — | 2.5 | 4 |
| 2 | 100 | — | — | — | 10 | 6.3 | — | — | — | — | — | 1 | 2 |
| 3 | 100 | — | — | — | 10 | 6.3 | — | — | — | — | 2.5 | 1 | 2 |
| 4 | 100 | — | — | — | 10 | 2.9 | — | — | — | — | 2.5 | <2.5 | 3 |
| 5 | 100 | — | — | — | 10 | — | — | — | — | — | 2.5 | 2.5 | 4 |
| 6 | 100 | — | — | — | 10 | — | 6 | — | — | — | 2.5 | <2.5 | 3 |
| 7 | 100 | — | — | — | — | — | — | 6.2 | — | — | 2.5 | <2.5 | 3 |
| 8 | 100 | — | — | — | 10 | — | — | — | — | — | 2.5 | NA | 1 |
| 9 | 100 | — | — | — | 10 | — | — | — | 10 | — | 2.5 | <2.5 | 3 |
| 10 | 100 | — | — | — | 10 | — | — | — | — | 8.3 | 2.5 | <2.5 | 3 |
| 11 | — | 100 | — | — | 10 | — | — | — | — | — | — | 20 | 5 |
| 12 | — | 100 | — | — | 10 | 6.3 | — | — | — | — | — | 10 | 3 |
| 13 | — | — | 100 | — | 0 | — | — | — | — | — | — | NA | 1 |
| 14 | — | — | 99 | — | 1 | — | — | — | — | — | — | 1.5 | 1 |
| 15 | — | — | 95 | — | 5 | — | — | — | — | — | — | 1.5 | 1 |
| 16 | — | — | 91 | — | 9 | — | — | — | — | — | — | 1.5 | 2 |
| 17 | — | — | — | 100 | 10 | — | — | — | — | — | 2.5 | NM | 5 |
| 18 | — | — | — | 100 | 10 | 6.3 | — | — | — | — | 2.5 | NM | 3 |

Delamination Rating Scale: 1-Excellent; 5-Poor; Viscosity Ratio as measured at 400 s$^{-1}$; NM = No measurement; NA = Not applicable

What is claimed is:

1. A polymer blend composition which comprises:
   a) a matrix phase polymer;
   b) a dispersed phase polymer being dispersed within the matrix phase polymer and initially having a lower viscosity than the matrix phase polymer; and
   c) a filler material contained within the dispersed phase polymer to form a modified dispersed phase polymer wherein the filler is substantially contained within the phase boundary of the modified dispersed phase polymer and wherein the filler is selected from the group consisting of carbon black, fumed titanium dioxide, fumed aluminum oxide, diatomaceous earth, talc, calcium carbonate, and combinations thereof;
   wherein the viscosity of the modified dispersed phase polymer is increased by the filler such that the viscosity ratio of the matrix phase polymer to the modified dispersed phase polymer is in a range between about 1 and about 12 at a shear rate of about 400 s$^{-1}$ at a temperature the blend is conventionally processed, thereby improving the stability of the dispersion of the modified dispersed phase polymer in the matrix phase polymer.

2. The composition of claim 1, wherein the matrix phase polymer is a thermoplastic polymer.

3. The composition of claim 2, wherein the thermoplastic polymer is selected from the group consisting of polyesters, polymer is in a range between about 1 and about 1.5 at a shear rate of about 400 s$^{-1}$ at a temperature the blend is conventionally processed.

7. The composition of claim 1, wherein the matrix phase polymer is present in a range between about 65% by weight and about 100% by weight of total polymer.

8. The composition of claim 1, wherein the ratio of the filler to the dispersed phase polymer is in a range between about 3% by weight and about 90% by weight of the dispersed phase polymer.

9. A method for the formation of a blend of a matrix phase polymer and a dispersed phase polymer initially having a lower viscosity than the matrix phase polymer, said method comprising:
   a) dispersing a filler material within the dispersed phase polymer to form a modified dispersed phase polymer having an increased viscosity such that the viscosity ratio of the matrix phase polymer to the modified dispersed phase polymer is in a range between about 1 and about 12 at a shear rate of about 400 s$^{-1}$ at a temperature the blend is conventionally processed wherein the filler is substantially contained within the phase boundary of the modified dispersed phase polymer and wherein the filler is selected from the group consisting of carbon black, fumed titanium dioxide, fumed aluminum oxide, diatomaceous earth, talc, calcium carbonate, and combinations thereof; and b) dispersing the modified dispersed phase polymer within the matrix phase polymer.

10. The method of claim 9, wherein the matrix phase polymer is a thermoplastic polymer.

11. The method of claim 10, wherein the thermoplastic polymer is selected from the group consisting of polyesters, polycarbonates, polystyrenes, polymethylmethacrylates, polyketones, polyamides, aromatic polyethers, polyether sulfones, polyether imides, polyether ketones, polyetherether ketones, polyphenylene ethers, polyphenylene sulfides, and combinations thereof.

12. The method of claim 9, wherein the dispersed phase polymer is a rubbery polymer.

13. The method of claim 12, wherein the rubbery polymer is selected from the group consisting of natural rubber, silicone rubber, ethylenepropylene rubber, ethylene/(alpha) olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

14. The method of claim 9, wherein the viscosity ratio of the matrix phase polymer to the modified dispersed phase polymer is in a range between about 1 and about 1.5 at a shear rate of about 400 $s^{-1}$ at a temperature the blend is conventionally processed.

15. The method of claim 9, wherein the matrix phase polymer is present in a range between about 65% by weight and about 99% by weight of total polymer.

16. The method of claim 9, wherein the ratio of the filler to the dispersed phase polymer is in a range between about 3% by weight and about 90% by weight of the dispersed phase polymer.

17. A method for the formation of a blend of a thermoplastic polymer and a rubber polymer initially having a lower viscosity than the thermoplastic polymer, said method comprising:
   a) dispersing a filler within the rubbery polymer to form a modified rubbery polymer having an increased viscosity such that the viscosity ratio of the matrix phase polymer to the modified dispersed phase polymer is in a range between about 1 and about 12 at a shear rate of about 400 $s^{-1}$ at a temperature the blend is conventionally processed wherein the filler is substantially contained within the phase boundary of the modified rubbery polymer and wherein the filler is selected from the group consisting of carbon black, fumed titanium dioxide, fumed aluminum oxide, diatomaceous earth, talc, calcium carbonate, and combinations thereof; and
   b) dispersing the modified rubbery polymer within the thermoplastic polymer.

18. The method of claim 17, wherein the thermoplastic polymer is selected from the group consisting of polyesters, polycarbonates, polystyrenes, polymethylmethacrylates, polyketones, polyamides, aromatic polyethers, polyether sulfones, polyether imides, polyether ketones, polyetherether ketones, polyphenylene ethers, polyphenylene sulfides, and combinations thereof.

19. The method of claim 17, wherein the rubbery polymer is selected from the group consisting of natural rubber, silicone rubber, ethylenepropylene rubber, ethylene/(alpha) olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

20. The method of claim 17, wherein the viscosity ratio of the thermoplastic polymer to the modified rubbery polymer is in a range between about 1 and about 1.5 at a shear rate of about 400 $s^{-1}$ at a temperature the blend is conventionally processed.

21. The method of claim 17, wherein the thermoplastic polymer is present in a range between about 65% by weight and about 99% by weight of total polymer.

22. The method of claim 17, wherein the ratio of the filler to the rubbery polymer is in a range between about 3% by weight and about 90% by weight of a rubbery polymer.

23. A method for the formation of a blend of a matrix phase polymer and a dispersed phase polymer, said method comprising at least one of the following steps
   (I) pre-dispersing the dispersed phase polymer with a filler selected from the group consisting of carbon black, fumed titanium dioxide, fumed aluminum oxide, diatomaceous earth, talc, calcium carbonate, and combinations thereof to form a modified dispersed phase polymer wherein the viscosity ratio of the matrix phase polymer to the modified dispersed phase polymer is in a range between about 1 and about 12 at a shear rate of about 400 $s^{-1}$ at a temperature the blend is conventionally processed;
   (II) mixing in a reactor the modified dispersed phase polymer with the matrix phase polymer to form a powder wherein the temperature in the reactor is less than the melting point of the matrix phase polymer; and
   (III) intimately mixing the powder wherein the temperature is greater than the melting point of the matrix phase polymer.

24. The method of claim 23, wherein the matrix phase polymer is a thermoplastic polymer.

25. The method of claim 24, wherein the thermoplastic polymer is selected from the group consisting of polyesters, polycarbonates, polystyrenes, polymethylmethacrylates, polyketones, polyamides, aromatic polyethers, polyether sulfones, polyether imides, polyether ketones, polyetherether ketones, polyphenylene ethers, polyphenylene sulfides, and combinations thereof.

26. The method of claim 23, wherein the dispersed phase polymer is a rubbery polymer.

27. The method of claim 26, wherein the rubbery polymer is selected from the group consisting of natural rubber, silicone rubber, ethylenepropylene rubber, ethylene/(alpha) olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

28. The method of claim 23, wherein the viscosity ratio of the matrix phase polymeric component to the modified dispersed phase polymeric component is in a range between about 1 and about 1.5 at a shear rate of about 400 $s^{-1}$ at a temperature the blend is conventionally processed.

29. The method of claim 23, wherein the matrix phase polymeric component is present in a range between about 65% by weight and about 99% by weight of total polymer.

30. The method of claim 23, wherein the ratio of the filler to the dispersed phase polymeric component is in a range between about 3% by weight and about 90% by weight of the dispersed phase polymeric component.

31. A method for the formation of a blend of a thermoplastic polymer and a rubbery polymer, said method comprising at least one of the following steps:
   (I) pre-dispersing the rubbery polymer with a filler selected from the group consisting of carbon black, fumed titanium dioxide, fumed aluminum oxide, diatomaceous earth, talc, calcium carbonate, and combinations thereof to form a modified rubbery polymer wherein the viscosity ratio of the thermoplastic polymer to the modified rubbery polymer is in a range between about 1 and about 12 at a shear rate of about 400 $s^{-1}$ at a temperature the blend is conventionally processed;

(II) mixing in a reactor the modified rubbery polymer with the thermoplastic polymer to form a powder wherein the temperature in the reactor is less than the melting point of the thermoplastic polymer; and (III) intimately mixing the powder wherein the temperature is greater than the melting point of the thermoplastic polymer.

32. The method of claim 31, wherein the thermoplastic polymer is selected from the group consisting of polyesters, polycarbonates, polystyrenes, polymethylmethacrylates, polyketones, polyamides, aromatic polyethers, polyether sulfones, polyether imides, polyether ketones, polyetherether ketones, polyphenylene ethers, polyphenylene sulfides, and combinations thereof.

33. The method of claim 31, wherein the rubbery polymer is selected from the group consisting of natural rubber, silicone rubber, ethylenepropylene rubber, ethylene/(alpha) olefin/nonconjugated polyene (EPDM) rubber, styrene/butadiene rubber, acrylonitrile/butadiene (NBR) rubber, polychloroprenes, sulfur modified polychloroprene, polybutadiene rubber, and combinations thereof.

34. The method of claim 31, wherein the viscosity ratio of the thermoplastic polymer to the modified rubbery polymer is in a range between about 1 and about 1.5 at a shear rate of about 400 $s^{-1}$ at a temperature the blend is conventionally processed.

35. The method of claim 31, wherein the thermoplastic polymer is present in a range between about 65% by weight and about 99% by weight of total polymer.

36. The method of claim 31, wherein the ratio of the filler to the rubbery polymer is in a range between about 3% by weight and about 90% by weight of rubbery polymer.

37. A polymer blend made by the method of claim 9.

38. A polymer blend made by the method of claim 17.

39. A polymer blend made by the method of claim 23.

40. A polymer blend made by the method of claim 31.

* * * * *